United States Patent
Vidal et al.

(10) Patent No.: US 10,235,600 B2
(45) Date of Patent: Mar. 19, 2019

(54) SYSTEM AND METHOD FOR STRUCTURED LOW-RANK MATRIX FACTORIZATION: OPTIMALITY, ALGORITHM, AND APPLICATIONS TO IMAGE PROCESSING

(71) Applicant: THE JOHNS HOPKINS UNIVERSITY, Baltimore, MD (US)

(72) Inventors: Rene Vidal, Fulton, MD (US);
Benjamin Haeffele, Oakland, CA (US);
Eric D. Young, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/189,270

(22) Filed: Jun. 22, 2016

(65) Prior Publication Data
US 2016/0371563 A1    Dec. 22, 2016

Related U.S. Application Data

(60) Provisional application No. 62/182,801, filed on Jun. 22, 2015.

(51) Int. Cl.
G06K 9/00 (2006.01)
G06K 9/62 (2006.01)
G06K 9/46 (2006.01)

(52) U.S. Cl.
CPC ... G06K 9/6247 (2013.01); G06K 2009/4695 (2013.01)

(58) Field of Classification Search
CPC .................. G06K 2009/4695; G06K 9/6247
See application file for complete search history.

(56) References Cited

U.S. PATENT DOCUMENTS

| | | | |
|---|---|---|---|
| 2010/0092074 A1* | 4/2010 | Liang | G06K 9/00375 382/159 |
| 2012/0134588 A1* | 5/2012 | Zhang | G06K 9/3275 382/176 |
| 2015/0130953 A1* | 5/2015 | Mansour | G06T 7/20 348/208.1 |
| 2016/0314579 A1* | 10/2016 | Ghouti | G06T 7/0012 |

OTHER PUBLICATIONS

Akerboom, J., et al., "Optimization of a GCaMP calcium indicator for neural activity imaging", The Journal of Neuroscience, 32:13819-13840, (2012).

(Continued)

*Primary Examiner* — Oneal R Mistry
(74) *Attorney, Agent, or Firm* — Johns Hopkins Technology Ventures

(57) ABSTRACT

The present invention provides a system and method for structured low-rank matrix factorization of data. The system and method involve solving an optimization problem that is not convex, but theoretical results should that a rank-deficient local minimum gives a global minimum. The system and method also involve an optimization strategy that is highly parallelizable and can be performed using a highly reduced set of variables. The present invention can be used for many large scale problems, with examples in biomedical video segmentation and hyperspectral compressed recovery.

14 Claims, 4 Drawing Sheets

```
Algorithm 1 (Structured Low-Rank Approximation)
    Input: Y, A⁰, Z⁰, λ, NumIter
    Initialize Â¹ = A⁰, Ẑ¹ = Z⁰
    for k = 1 to NumIter do
        \\Calculate gradient of loss function w.r.t. A
        \\evaluated at the extrapolated point Â
        Gᵏ_A = ∇_A ℓ(Y, Âᵏ(Ẑᵏ)ᵀ)
        P = Âᵏ − Gᵏ_A/Lᵏ_A
        \\Calculate proximal operator of ‖·‖_o
        \\for every column of A
        for i = 1 to number of columns in A do
            Aᵏ_i = prox_{λ g_{A,i} + h_i/Lᵏ_A}(P_i)
        end for
        \\Repeat similar process for Z
        Gᵏ_Z = ∇_Z ℓ(Y, Âᵏ(Ẑᵏ)ᵀ)
        W = Ẑᵏ − Gᵏ_Z/Lᵏ_Z
        for i = 1 to number of columns in Z do
            Zᵏ_i = prox_{λ g_{Z,i} + h_i/Lᵏ_Z}(W_i)
        end for
        \\Update extrapolation based on prior iterates
        Âᵏ⁺¹ = Extrapolate_A(Aᵏ, Aᵏ⁻¹)
        Ẑᵏ⁺¹ = Extrapolate_Z(Zᵏ, Zᵏ⁻¹)
    end for
```

(56) References Cited

OTHER PUBLICATIONS

Bach, F., "Convex relaxations of structured matrix factorizations", arXiv:1309.3117v1, (2013).
Bach, F., et al., "Convex sparse matrix factorizations", arXiv:0812.1869v1, (2008).
Basri, R., et al., "Lambertian reflectance and linear subspaces", IEEE Transactions on Pattern Analysis and Machine Intelligence, 25(2):218-233, (2003).
Beck, A., et al., "A fast iterative shrinkage-thresholding algorithm for linear inverse problems", SIAM Journal on Imaging Sciences, 2:183-202, (2009).
Birkholz, H., "A unifying approach to isotropic and anisotropic total variation denoising models" J. of Computational and Applied Mathematics, 235:2502-2514, (2011).
Burer, S., et al., "Local minima and convergence in low-rank semidefinite programming", Mathematical Programming, Series A, (103):427-444, (2005).
Combettes, P., et al., "Proximal splitting methods in signal processing", In Fixed-Point Algorithms for Inverse Problems in Science and Engineering, vol. 49, pp. 185-212. Springer-Verlag, (2011).
Golbabaee, M., et al., Joint trace/tv minimization: A new efficient approach for spectral compressive imaging. In 19th IEEE Internation Conference on Image Processing, pp. 933-936, (2012).
Parikh, N., et al., "Proximal algorithms", Foundations and Trends in Optimization, 1:123-231, (2013).
Pnevmatikakis, E., et al., "Rank-penalized nonnegative spatiotemporal deconvolution and demixing of calcium imaging data", Abstract: Computational and Systems Neuroscience (Cosyne), (2013).
Recht, B., et al., "Guaranteed minimum-rank solutions of linear matrix equations via nuclear norm minimization", SIAM Review, 52:471-501, (2010).
Romberg J., "Compressive sensing by random convolution", SIAM J. Img. Sci., 2(4):1098-1128, (2009).
Rudin, L., et al., "Nonlinear total variation based noise removal algorithms", Physica D: Nonlinear Phenomena, 60:259-268, (1992).
Spruston, N., "Pyramidal neurons: Dendritic structure and synaptic integration" Nature Reviews Neuroscience, 9:206-221, (2008).
Stosiek, C., et al., "In vivo two-photon calcium imaging of neuronal networks", Proceedings of the National Academy of Sciences of the United States of America, 100(12):7319-7324, (2003).
Vogelstein, J., et al., "Fast nonnegative deconvolution for spike train inference from population calcium imaging" Journal of Neurophysiology, 104(6):3691-3704, (2010).
Xu, Y., et al., "A block coordinate descent method for regularized multiconvex optimization with applications to nonnegative tensor factorization and completion", SIAM Journal of Imaging Sciences, 6(3):1758-1789, (2013).
Zhang, H., et al., "Hyperspectral image restoration using low-rank matrix recovery", IEEE Trans. on Geoscience and Remote Sensing, pp. 1-15, (2013).

* cited by examiner

Algorithm 1 (Structured Low-Rank Approximation)

Input: $Y, A^0, Z^0, \lambda$, NumIter
Initialize $\hat{A}^1 = A^0, \hat{Z}^1 = Z^0$
for $k = 1$ to NumIter do
   \\Calculate gradient of loss function w.r.t. $A$
   \\evaluated at the extrapolated point $\hat{A}$
   $G_A^k = \nabla_A \ell(Y, \hat{A}^k (Z^k)^T)$
   $P = \hat{A}^k - G_A^k / L_A^k$
   \\Calculate proximal operator of $\|\cdot\|_\alpha$
   \\for every column of $A$
   for $i = 1$ to number of columns in $A$ do
      $A_i^k = \mathrm{prox}_{\lambda \|Z_i\|_\alpha \|\cdot\|_\alpha / L_A^k}(P_i)$
   end for
   \\Repeat similar process for $Z$
   $G_Z^k = \nabla_Z \ell(Y, A^k (\hat{Z}^k)^T)$
   $W = \hat{Z}^k - G_Z^k / L_Z^k$
   for $i = 1$ to number of columns in $Z$ do
      $Z_i^k = \mathrm{prox}_{\lambda \|A_i\|_\alpha \|\cdot\|_\alpha / L_Z^k}(W_i)$
   end for
   \\Update extrapolation based on prior iterates
   $\hat{A}^{k+1} = Extrapolate_A(A^k, A^{k-1})$
   $\hat{Z}^{k+1} = Extrapolate_Z(Z^k, Z^{k-1})$
end for

FIG. 1

SYSTEM AND METHOD FOR STRUCTURED LOW-RANK MATRIX FACTORIZATION: OPTIMALITY, ALGORITHM, AND APPLICATIONS TO IMAGE PROCESSING

CROSS REFERENCE TO RELATED APPLICATIONS

This application claims the benefit of U.S. Provisional Patent Application No. 62/182,801 filed Jun. 22, 2015, which is incorporated by reference herein, in its entirety.

GOVERNMENT RIGHTS

This invention was made with government support under DC00115 and DC000023 awarded by the National Institutes of Health and 11-1218709 awarded by the National Science Foundation. The government has certain rights in the invention.

FIELD OF THE INVENTION

The present invention relates generally to image processing. More particularly, the present invention relates to a system and method for structured low-rank matrix factorization for image processing.

BACKGROUND OF THE INVENTION

In many large datasets the relevant information often lies in a low-dimensional subspace of the ambient space, leading to a large interest in representing data with low-rank approximations. A common formulation for this problem is as a regularized loss problem of the form $$\min_{X} l(Y, X) + \lambda R(X), \quad (1)$$

where $Y \in \mathbb{R}^{t \times p}$ is the data matrix, $X \in \mathbb{R}^{t \times p}$ is the low-rank approximation, $l(\bullet)$ is a loss function that measure how well X approximates Y, and $R(\bullet)$ is a regularization function that promotes various desired properties in X (low-rank, sparsity, group-sparsity, etc.). When l and R are convex functions of X, and the dimensions of Y are not too large, the above problem can be solved efficiently using existing algorithms, which have achieved impressive results. However, when t is the number of frames in a video and p is the number of pixels, for example, optimizing over O(tp) variables can be prohibitive.

To address this, one can exploit the fact that if X is low-rank, then there exist matrices $A \in \mathbb{R}^{t \times r}$ and $Z \in \mathbb{R}^{p \times r}$ (which will be referred to as the column and row spaces of X, respectively) such that $Y \approx X = AZ^T$ and $r \ll \min(t, p)$. This leads to the following matrix factorization problem, in which an A and Z that minimize are needed $$\min_{A,Z} l(Y, AZ^T) + \lambda \tilde{R}(A, Z), \quad (2)$$

where $\tilde{R}(\bullet, \bullet)$ is now a regularizer on the factors A and Z. By working directly with a factorized formulation such as (2), the size of the optimization problem is reduced from O(tp) to O(r(t+p)). Additionally, in many applications of low-rank modeling the factors obtained from the factorization often contain information relevant to the problem and can be used as features for further analysis, such as in classical PCA. Placing regularization directly on the factors thus allows one to promote additional structure on the factorized matrices A and Z beyond simply being a low-rank approximation, e.g. in sparse dictionary learning the matrix Z should be sparse. However, the price to be paid for these advantages is that the resulting optimization problems are typically not convex due to the product of A and Z, which poses significant challenges.

Despite the growing availability of tools for low-rank recovery and approximation and the utility of deriving features from low-rank representations, many techniques fail to incorporate additional information about the underlying row and columns spaces which are often known a priori. In computer vision, for example, a collection of images of an object taken under different illuminations has not only a low-rank representation, but also significant spatial structure relating to the statistics of the scene, such as sparseness on a particular wavelet basis or low total variation.

Accordingly, there is a need in the art for a low-rank matrix factorization that exploits these additional structures in the data and can be efficiently applied to large datasets, such as images and videos.

SUMMARY OF THE INVENTION

The foregoing needs are met, to a great extent, by the present invention which provides a method of data processing including receiving data for processing. The method includes applying a specific matrix factorization technique to the data, wherein factors are regularized by a projective tensor norm. The method also includes solving an optimization problem to find a global minimum, and generating and displaying revised data based on the processed data.

In accordance with an aspect of the present invention, the method includes receiving image data or video image data. The method includes applying the method to one selected from a group consisting of video segmentation and hyperspectral compressed recovery. The method includes using a non-transitory computer readable medium programmed with the steps of the method for executing the method. The method includes incorporating prior information into the matrix factorization technique. The method includes using a rank-deficient local minimum to determine the global minimum.

In accordance with another aspect of the present invention, a method of data processing includes obtaining data for processing. The method includes applying a matrix factorization to the data. The method includes applying a projective tensor norm to regularize the factorization of the data. A local minimum of the matrix factorization is used to find a global minimum for the data. The method also includes generating and displaying revised data based on the processed data. The data takes the form of image data or video image data. The method is applied to one selected from a group consisting of video segmentation and hyperspectral compressed recovery. A non-transitory computer readable medium is programmed with the steps of the method for executing the method.

In accordance with yet another aspect of the present invention, a non-transitory computer readable medium programmed with steps including receiving data for processing. The non-transitory computer readable medium is programmed for applying a specific matrix factorization technique to the data, wherein factors are regularized by a projective tensor norm and solving an optimization problem to find a global minimum. The non-transitory computer readable medium is also programmed for generating and displaying revised data based on the processed data.

In accordance with still another aspect of the present invention, the non-transitory computer readable medium is programmed for receiving image data or video image data. The non-transitory computer readable medium is programmed for applying the method to one selected from a group consisting of video segmentation and hyperspectral compressed recovery. The non-transitory computer readable medium is programmed for incorporating prior information into the matrix factorization technique. The non-transitory computer readable medium is programmed for using a rank-deficient local minimum to determine a global minimum. The non-transitory computer readable medium resides on a computing device. The non-transitory computer readable medium is programmed for applications selected from a group consisting of biomedical video segmentation and hyperspectral compressed recovery.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIG. 1 illustrates an algorithm according to an embodiment of the present invention.

DETAILED DESCRIPTION

Figure 2:
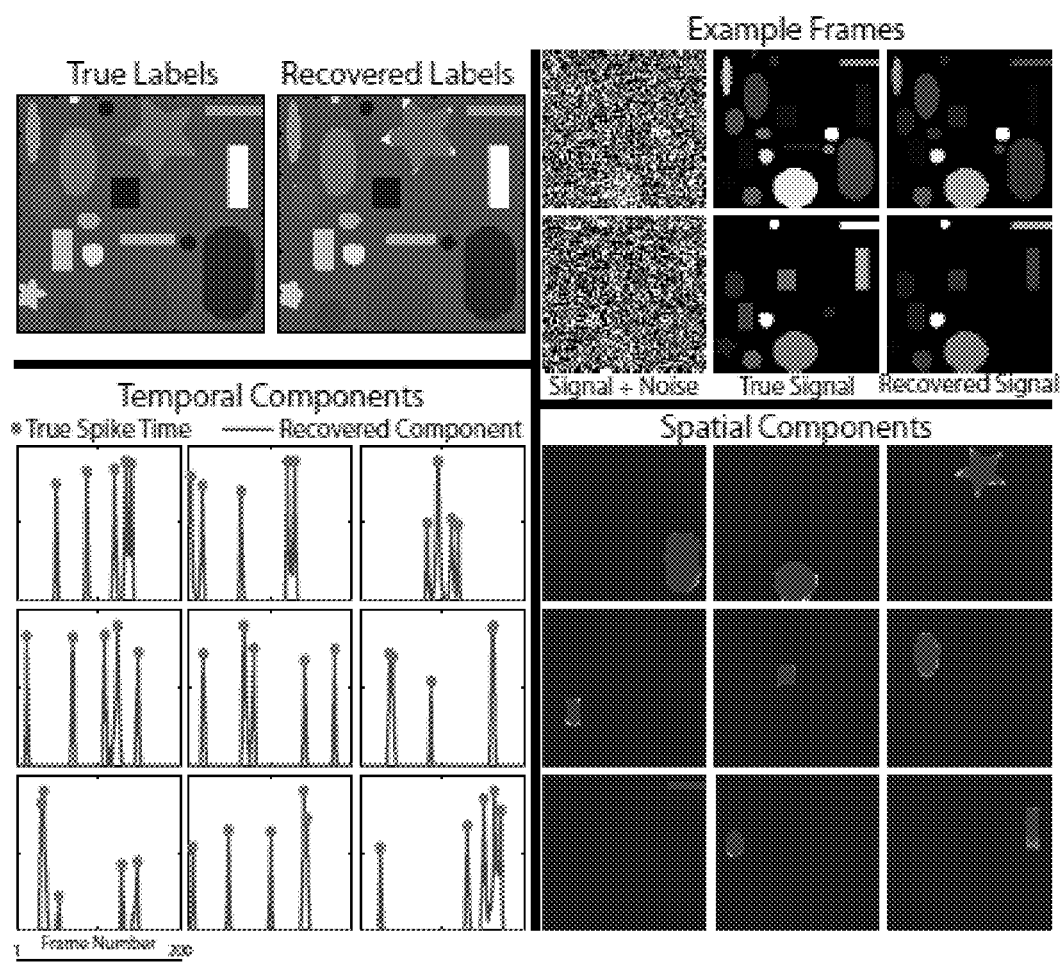
FIG. 2 illustrates images of results of an experiment with phantom calcium imaging dataset.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains, having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention provides a system and method for structured low-rank matrix factorization of data. The system and method involve solving an optimization problem that is not convex, but theoretical results should that a rank-deficient local minimum gives a global minimum. The system and method also involve an optimization strategy that is highly parallelizable and can be performed using a highly reduced set of variables. The present invention can be used for many large scale problems, with examples in biomedical video segmentation and hyperspectral compressed recovery.

Convex solutions to low-rank matrix factorization problems have received increased attention in machine learning. However, in many applications the data can display other structures beyond simply being low-rank. For example, images and videos present complex spatio-temporal structures, which are largely ignored by current low-rank methods. Therefore, the present invention is directed to a matrix factorization system and method that is suitable for large datasets that captures additional structure in the factors by using a projective tensor norm, which includes classical image regularizers such as total variation and the nuclear norm as particular cases.

Although the resulting optimization method is not convex, under certain conditions on the factors, any local minimizer for the factors yields a global minimizer for their product. Examples in biomedical video segmentation and hyperspectral compressed recovery show the advantages of the system and method on high-dimensional datasets.

As a reference, the following will provide a key for notation as well as definitions for proximal operators. For $q \in [1; \infty]$, the $l_q$ norm of a vector $x \in \mathbb{R}^t$ $\|x\|_q = (\sum_{i=1}^{t} |x_i|^q)_{1/q}$, where $x_i$ is the ith entry of x. Also, the ith column of a matrix by $X \in \mathbb{R}^{t \times p}$ by $X_i$, its trace as $\mathrm{Tr}(X)$, and its Frobenius norm as $\|X\|_F$. For a function W(X), its Fenchel dual is $$W^*(X) \equiv \sup_z \mathrm{Tr}(Z^T X) - W(Z). \tag{3}$$

For a norm $\|X\|$, with some abuse of notation, its dual norm is $\|X\|^* \equiv \sup_{\|z\| \le 1} \mathrm{Tr}(Z^T X)$. The space of n×n positive semidefinite matrices is denoted as $s_n^+$. For a function $f$, if $f$ is non-convex we use $\partial f$ to denote the general subgradient of $f$, if $f$ is convex the general subgradient is equivalent to the regular subgradient and will also be denoted as $\partial f$, with the specific subgradient definition being known from the context.

Proximal operators are used in the optimization algorithm and are defined as follows.

The proximal operator of a closed convex function $\theta(x)$ is defined as $$prox_\theta(y) \equiv \mathrm{argmin}_x \frac{1}{2} \|y - x\|_2^2 + \theta(x). \tag{4}$$

To find structured matrix factorizations, the following matrix norm is used. Given vector norms $\|\cdot\|_a$ and $\|\cdot\|_z$, the Projective Tensor Norm of a matrix $X \in \mathbb{R}^{t \times p}$ is defined as $$\|X\|_P \equiv \inf_{A, Z: AZ^T = X} \sum_i \|A_i\|_a \|Z_i\|_z \tag{5}$$

$$= \inf_{A, Z: AZ^T = X} \frac{1}{2} \sum_i (\|A_i\|_a^2 + \|Z_i\|_z^2) \tag{6}$$

It can be shown that $\|X\|_P$ is a valid norm on X; however, a critical point is that for general norms $\|\cdot\|_a$ and $\|\cdot\|_z$, the summation in (5) and (6) might need to be over an infinite number of columns of A and Z. A particular case where this sum is known to be bounded is when $\|\cdot\|_a = \|\cdot\|_2$ and $\|\cdot\|_z = \|\cdot\|_2$. In this case $\|X\|_P$ reverts to the nuclear norm $\|X\|_*$ (sum of singular values of X), which is widely used as a convex relaxation of matrix rank and can optimally recover low-rank matrices under certain conditions.

More generally, the projective tensor norm provides a natural framework for structured matrix factorizations, where appropriate norms can be chosen to reflect the desired properties of the row and column spaces of the matrix. For instance, the projective tensor norm was studied in the context of sparse dictionary learning, where it was referred to as the Decomposition Norm. In this case, one can use combinations of the $l_1$ and $l_2$ norms to produce a tradeoff between the number of factorized elements (number of columns in A and Z) and the sparsity of the factorized elements. The projective tensor norm can be considered a special case of a much more general matrix factorization framework based on gauge functions. This allows additional structure to be placed on the factors A and Z (for example non-negativity), while still resulting in a convex regularizer, offering significant potential extensions for future work.

There is a link between traditional convex loss problems (1), which offer guarantees of global optimality, and factorized formulations (2), which offer additional flexibility in modeling the data structure and recovery of features that can be used in subsequent analysis. The projective tensor norm as a regularizer, leading to the following structured low-rank matrix factorization problem.

$$\min_X l(Y, X) + \lambda \|X\|_P \qquad (7)$$

Given the definition of the projective tensor norm, this problem is equivalently minimized by solutions to the non-convex problem $$\min_{A,Z} l(Y, AZ^T) + \lambda \sum_i \|A_i\|_a \|Z_i\|_z \qquad (8)$$

Because there is interest in capturing certain structures in the column and row spaces of X, while at the same time capturing low-rank structures in X, norms of the form $$\|\cdot\|_a = \nu_a \|\cdot\|_{\tilde{a}} + \|\cdot\|_2$$

$$\|\cdot\|_z = \nu_z \|\cdot\|_{\tilde{z}} + \|\cdot\|_2 \qquad (9)$$

are considered. Here $\|\cdot\|_{\tilde{a}}$ and $\|\cdot\|_{\tilde{z}}$ hare norms that model the desired properties of the column and row spaces of X, respectively, and $\nu_a$ and $\nu_z$ balance the tradeoff between those desired properties and the rank of the solution (recall that when $\nu_a = \nu_z = 0$, $\|X\|_P$ reduces to the nuclear norm $\|X\|_*$).

While (7) is a convex function of the product $X = AZ^T$, it is still non-convex with respect to A and Z jointly. However, if we define a matrix Q to be the concatenation of A and Z $$Q \equiv \begin{bmatrix} A \\ Z \end{bmatrix} \Rightarrow QQ^T = \begin{bmatrix} AA^T & AZ^T \\ ZA^T & ZZ^T \end{bmatrix}, \qquad (10)$$

we see that $AZ^T$ is a submatrix of the positive semidefinite matrix $X = QQ^T$. After defining the function $F: S_n^+ \to \mathbb{R}$ $$F(QQ^T) = l(Y, AZ^T) + \lambda \|AZ^T\|_P \qquad (11)$$

it is clear that the proposed formulation (7) can be recast as an optimization over a positive semidefinite matrix $X = QQ^T$. At first this seems to be a circular argument, because while F(X) is a convex function of X, this says nothing about finding Q (or A and Z). However, recent results for semi-definite programs in standard form show that one can minimize F(X) by solving for Q directly without introducing any additional local minima, provided that the rank of Q is larger than the rank of the true solution $X^{true}$. Note, however, that for general norms $\|\cdot\|_a$ and $\|\cdot\|_z$, Q may not contain a factorization which achieves the infimum in (5). Additionally, if the rank of the true solution is not known a priori, the following key result shows that when F(X) is twice differentiable, it is often possible to optimize $F(QQ^T)$ with respect to Q and still be assured of a global minimum.

Let $F: S_n^+ \to \mathbb{R}$ be a twice differentiable convex function with compact level sets. If Q is a rank-deficient local minimum of $f(Q) = F(QQ^T)$, then $X = QQ^T$ is a global minimum of F(X).

Unfortunately, while many common loss functions are convex and twice differentiable, this result cannot be applied directly due to the fact that the projective tensor norm is clearly non-differentiable for general norms $\|\cdot\|_a$ and $\|\cdot\|_z$. In what follows, the above result is extended to the non-differentiable case and describes an algorithm to minimize (8) suitable to large problems.

The results from above are applied to $F: S_n^+ \to \mathbb{R}$ of the form $$F(X) = G(X) + H(X) \qquad (12)$$

where $G: S_n^+ \to \mathbb{R}$ is a twice differentiable convex function with compact level sets and $H: S_n^+ \mathbb{R}$ is a (possibly non-differentiable) proper convex function such that F is lower semi-continuous. Before presenting the main result define $g(Q) = G(QQ^T)$, $h(Q) = H(QQ^T)$, $f(Q) = g(Q) + h(Q) = F(QQ^T)$ and note the following. Lemma 1: If Q is a local minimum of $f(Q) = F(QQ^T)$, where $F: S_n^+ \to \mathbb{R}$ is a function form in (12), then $\exists \Lambda \exists \partial H(QQ^T)$ such that $0 = 2\nabla G(QQ^T)Q + 2\Lambda Q$. If Q is a local minimum of f(Q), then it is necessary that $0 \in \partial f(Q)$. Let $\nabla(Q) = QQ^T$. Then, $\partial f(Q) \subseteq \nabla V(Q)^T (\nabla G(QQ^T) + \partial H(QQ^T))$. From the symmetry of $\nabla G(QQ^T)$ and $\partial H(QQ^T)$, we get $\nabla V(Q)^T \nabla G(QQ^T) = 2\nabla G(QQ^T)Q$ and $\nabla V(Q)^T \partial H(QQ^T) = 2\partial H(QQ^T)Q$, as claimed.

Let $F: S_n^+ \to \mathbb{R}$ be a function of the form in (12). If Q is a rank-deficient local minimum of $f(Q) = F(QQ^T)$, then $X = QQ^T$ is a global minimum of F(X).

Another variable is introduced subject to an equality constraint $$\min_{X \succeq 0} G(X) + H(X) = \min_{X \succeq 0, Y} G(X) + H(Y) \text{ s.t. } X = Y \qquad (13)$$

This gives the Lagrangian $$L(X, Y, \Lambda) = G(X) + H(Y) + Tr(\Lambda^T(X - Y)) \qquad (14)$$

Minimizing the Lagrangian w.r.t. Y we obtain $$\min_Y H(Y) - Tr(\Lambda^T Y) = -H^*(\Lambda) \qquad (15)$$

Let $k(Q, \Lambda) = G(QQ^T) + Tr(\Lambda^T QQ^T)$ and let $X_\Lambda$ denote a value of X which minimizes the Lagrangian w.r.t. X for a fixed value of $\Lambda$. Assuming strong duality, we have $$\min_{X \succeq 0} F(X) = \max_\Lambda \min_{X \succeq 0} G(X) + Tr(\Lambda^T X) - H^*(\Lambda) \qquad (16)$$

If the value of $\Lambda$ is fixed, then a rank-deficient local minimum of $k(Q, \Lambda)$ minimizes the Lagrangian w.r.t. X for $X_\Lambda = QQ^T$. In particular, if $\Lambda$ is fixed such that it satisfies Lemma 1, $$\frac{\partial}{\partial Q} k(Q, \Lambda) = 2\nabla G(QQ^T)Q + 2\Lambda Q = 0, \text{ so } X_\Lambda = QQ^T$$

is a global minimum of the Lagrangian w.r.t. X for a fixed $\Lambda$ that satisfies Lemma 1. Additionally, since $\Lambda$ was chosen to satisfy Lemma 1, then we have $\Lambda \in \partial H(QQ^T) \Rightarrow X_\Lambda QQ^T \in \partial H^*(\Lambda)$ (due to the easily shown fact that $X_\Lambda \in \partial H^*(\Lambda) \Leftrightarrow \Lambda \in \partial H(X_\Lambda)$). Combining these results, we have that $(QQ^T, \Lambda)$ is a primal-dual saddle point, so $X = QQ^T$ is a global minimum of F(X).

The particular method presented here assumes that the gradients of the loss function $l(Y, AZ^T)$ w.r.t. A and w.r.t. Z (denoted as $\nabla_A l(Y, AZ^T)$ and $\nabla Z l(Y, AZ^T)$, respectively) are Lipschitz continuous with Lipschitz constants $L_A^k$ and $L_Z^k$ (in general the Lipschitz constant of the gradient will depend on the current value of the variables at that iteration, hence the superscript). Under these assumptions on $\ell$, the bilinear structure of our objective function (8) gives convex subproblems if A or Z are updated independently while holding the other fixed, making an alternating minimization strategy efficient and easy to implement. Specifically, the updates to our variables are made using accelerated proximal-linear steps similar to the FISTA algorithm, which entails solving a proximal operator of an extrapolated gradient step to update each variable. The general structure of the alternating minimization we use is given in Algorithm 1 in FIG. 1, but the key point is that to update either A or Z the primary computational burden lies in calculating the gradient of the loss function and then calculating a proximal operator. The structure of the non-differentiable term in (8) allows the proximal operator to be separated into columns, greatly reducing the complexity of calculating the proximal operator and offering the potential for parallelization. Moreover, the following result provides a simple method to calculate the proximal operator of the $l_2$ norm combined with any norm.

Let $\|\cdot\|$ be any vector norm. The proximal operator of $\theta(x) = \lambda_1\|x\| + \lambda_2\|x\|_2$ is the composition of the proximal operator of the $l_2$ norm and the proximal operator of $\|\cdot\|$, i.e., $\text{prox}_\theta(y) = \text{prox}_\theta(y) = \text{prox}_{\lambda_2\|\cdot\|_2}(\text{prox}_{\lambda_1\|\cdot\|}(y))$.

This provides a strategy to search for structured low-rank matrix factorizations as only a rank-deficient local minimum needs to be found to conclude that a global minimum has been found. However, there are a few critical caveats to note about the optimization problem. First, alternating minimization does not guarantee convergence to a local minimum. It has been shown that, subject to a few conditions, block convex functions will globally converge to a Nash equilibrium point via the alternating minimization algorithm used here, and any local minima must also be a Nash equilibrium point (although unfortunately the converse is not true). The objective function as presented in (8) does not meet these conditions as the non-differentiable elements are not separated into summable blocks, but by using the equivalence between (5) and (6) it can easily be converted to a form that does. Of practical importance, this implies that multiple stationary points which are not local minima can be encountered and the variables cannot be initialized arbitrarily. For example, $(A; Z) = (0; 0)$ is a Nash equilibrium point of (8). Nevertheless, it is observed that empirically good results are obtained in the examples with very trivial initializations.

Second, although it can be shown that the projective tensor norm defined by (5) is a valid norm if the sum is taken over a potentially infinite number of columns of A and Z, for general vector norms $\|\cdot\|_a$ and $\|\cdot\|_z$ it is not necessarily known a priori if a finite number of columns of A and Z can achieve the infimum. Here for norms of the form given in (9) the infimum of (5) can be achieved or closely approximated by summing over a number of columns equal to the rank of AZT (again recall the equivalence with the nuclear norm when $v_a = v_z = 0$). Good empirical results are noted by setting the number of columns of A and Z to be larger than the expected rank of the solution but smaller than full rank, a strategy that has been shown to be optimally convergent for semidefinite programs in standard form.

The matrix factorization method is demonstrated on two image processing problems: spatiotemporal segmentation of neural calcium imaging data and hyperspectral compressed recovery. These two problems are included merely by way of example and are in no way to be considered limiting. Such problems are well modeled by low-rank linear models with square loss functions under the assumption that the spatial component of the data has low total variation (and is optionally sparse in the row and/or column space). Specifically, the following objective is considered $$\min_{A,Z} \frac{1}{2} \|Y - \Phi(AZ^T)\|_F^2 + \lambda \sum_i \|A_i\|_a \|Z_i\|_z \quad (17)$$

$$\|\cdot\|_a = v_a \|\cdot\|_1 + \|\cdot\|_2 \quad (18)$$

$$\|\cdot\|_z = v_{z1} \|\cdot\|_1 + v_{zTV} \|\cdot\|TV + \|\cdot\|_2, \quad (19)$$

where $\Phi(\bullet)$ is a linear operator, and $v_a$, $v_{z1}$, and $v_{zTV}$ are non-negative scalars. It is straightforward to extend the method to include nonnegative constrains on A and Z, but this had little effect on the experimental results. The results presented here are all without constraints on the sign for simplicity of presentation. Recall that the anisotropic total variation of x is defined as $$\|x\|_{TV} \equiv \sum_i \sum_{j \in N_i} |x_i - x_j| \quad (20)$$

where $N_i$ denotes the set of pixels in the neighborhood of pixel i.

Calcium imaging is a rapidly growing microscopy technique in neuroscience that records fluorescent images from neurons that have been loaded with either synthetic or genetically encoded fluorescent calcium indicator molecules. When a neuron fires an electrical action potential (or spike), calcium enters the cell and binds to the fluorescent calcium indicator molecules, changing the fluorescence properties of the molecule. By recording movies of the calcium-induced fluorescent dynamics it is possible to infer the spiking activity from large populations of neurons with single neuron resolution. If given the fluorescence time series from a single neuron, inferring the spiking activity from the fluorescence time series is well modeled via a Lasso style estimation, $$\hat{s} = \arg\min_{s \geq 0} \frac{1}{2} \|y - Ds\|_2^2 + \lambda \|s\|_1, \quad (21)$$

where $y \in \mathbb{R}^t$ is the fluorescence time series (normalized by the baseline fluorescence), $s \in \mathbb{R}^t$ denotes the estimated spiking activity (each entry of $\hat{s}$ is monotonically related to the number of action potentials the neuron has during that imaging frame), and $D \in \mathbb{R}^{t \times t}$ is a matrix that applies a convolution with a known decaying exponential to model the change in fluorescence resulting from a neural action potential. One of the challenges in neural calcium imaging is that the data can have a significant noise level, making manual segmentation challenging. Additionally, it is also possible to have two neurons overlap in the spatial domain if the focal plane of the microscope is thicker than the size of the distinct neural structures in the data, making simultaneous spatiotemporal segmentation necessary. A possible strategy to address these issues would be to extend (21) to estimate spiking activity for the whole data volume via the objective $$\hat{S} = \arg\min_{S \geq 0} \frac{1}{2} \|Y - DS\|_F^2 + \lambda \|S\|_1, \quad (22)$$

where now each column of $Y \in \mathbb{R}^{t \times p}$ contains the fluorescent time series for a single pixel and the corresponding column of $\hat{S} \in \mathbb{R}^{t \times p}$ contains the estimated spiking activity for that pixel. However, due to the significant noise often present in the actual data, solving (22) directly typically gives poor results. To address this issue, An additional low-rank regularization can be added to (22) based on the knowledge that if two pixels are from the same neural structure they should have identical spiking activities, giving S a low-rank structure with the rank of S corresponding to the number of neural structures in the data. Specifically, they propose an objective to promote low-rank and sparse spike estimates, $$\hat{S} = \arg\min_{S \geq 0} \frac{1}{2} \|Y - DS\|_F^2 + \lambda \|S\|_1 + \lambda_2 \|S\|_*  \quad (23)$$

and then estimate the temporal and spatial features by performing a non-negative matrix factorization of $\hat{S}$.

It can be shown that problem (17) is equivalent to a standard Lasso estimation when both the row space and column space are regularized by the $l_1$ norm, while combined $l_1$, $l_2$ norms of the form (18) and (19) with $v_{zTV}=0$ promote solutions that are simultaneously sparse and low rank. Thus, the projective tensor norm can generalize the two prior methods for calcium image processing by providing regularizations that are sparse or simultaneously sparse and low-rank. Here, these formulations are further extended by noting that if two pixels are neighboring each other it is likely that they are from the same neural structure and thus have identical spiking activity, implying low total variation in the spatial domain. The flexible nature of the formulation (17) is shown by using it to process calcium image data with regularizations that are either sparse, simultaneously sparse and low-rank, or simultaneously sparse, low-rank, and with low total variation. Additionally, by optimizing (17) to simultaneously estimate temporal spiking activity A and neuron shape Z, with $\Phi(AZ^T)=DAZ^T$, spatial and temporal features are inherently found in the data (which are largely non-negative even though not explicitly constrained to be) directly from the optimization without the need for an additional matrix factorization step. FIG. 2 illustrates images of results of an experiment with phantom calcium imaging dataset. Top Left: True regions and regions recovered via k-means clustering on the spatial components. Top Right: Two example frames from the dataset, showing the signal with added noise (left), true signal (middle), and recovered signal (right). Bottom Left: First 9 most significant recovered temporal components (columns of A). The estimated temporal feature is shown as a line, while the true spike times are shown as dots. Bottom Right: First 9 most significant spatial features (columns of Z).

The algorithm was first tested on a simulated phantom using the combined sparse, low-rank, and total variation regularization. The phantom was constructed with 19 non-overlapping spatial regions and 5 randomly timed action potentials and corresponding calcium dynamics per region. Gaussian white noise was added to the modeled calcium signal to produce an SNR of approximately −16 dB (see top panels of FIG. 2). A was initialized to be an identity matrix and Z=0.5 Despite the high levels of noise and simple initialization, the recovered spatial factors (columns of Z) corresponded to the actual region shapes and the recovered temporal factors (columns of A) showed strong peaks near the true spike times (FIG. 2, bottom panels). Additionally, simple k-means clustering on the columns of Z recovered the true region labels with high accuracy (FIG. 2, top left panel), and, although not specifically enforced non-negative entries in A and Z, the recovered matrices had no negative entries.

Figure 3:
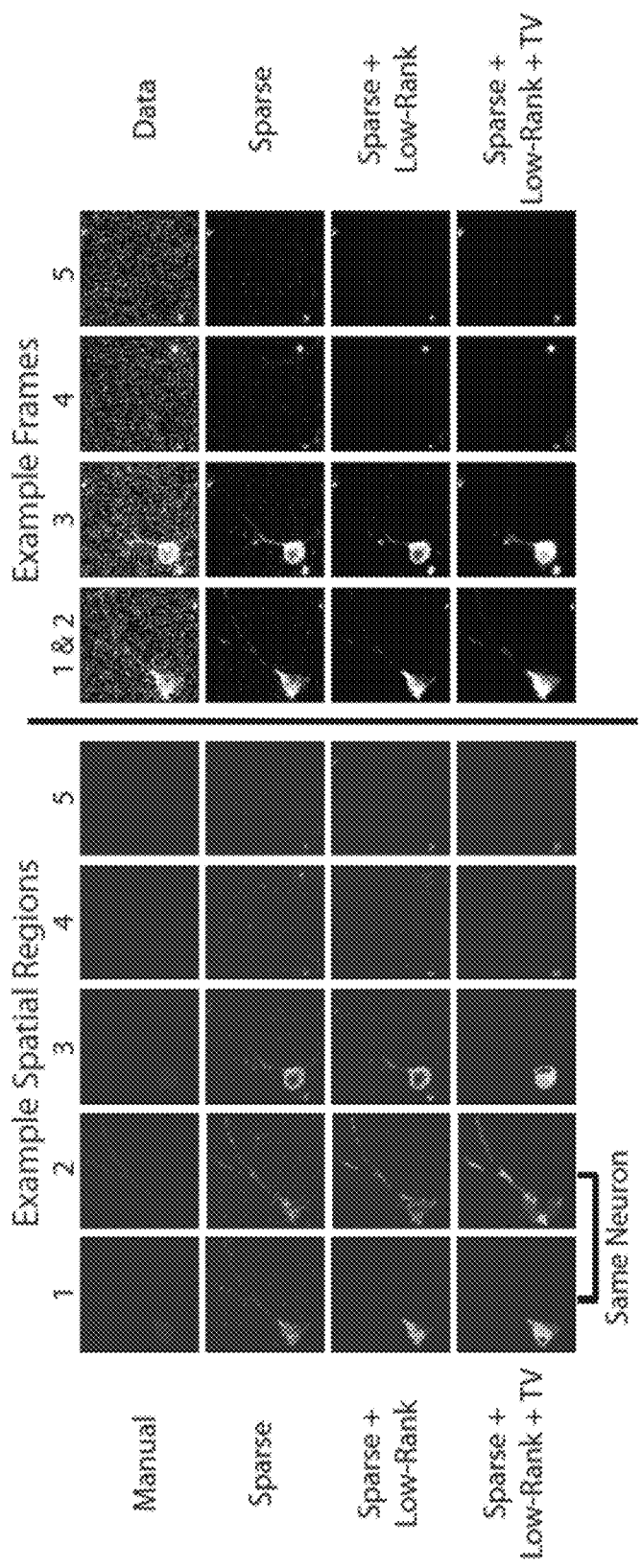
FIG. 3 illustrates images results from the in vivo calcium imaging dataset.

The algorithm was also tested on actual calcium image data taken in vivo from the primary auditory cortex of a mouse that was transfected with the genetic calcium indicator GCaMP5. FIG. 3 illustrates images results from the in vivo calcium imaging dataset. Left: Demonstration of spatial features for 5 example regions. (Top Row) Manually segmented regions. (Bottom 3 Rows) Corresponding spatial feature recovered by our method with various regularizations. Note that regions 1 and 2 are different parts of the same neurons—see discussion in the text. Right: Example frames from the dataset corresponding to time points where the example regions display a significant calcium signal. (Top Row) Actual Data. (Bottom 3 Rows) Estimated signal for the example frame with various regularizations. The left panel of FIG. 3 shows 5 manually labeled regions from the dataset (top row) and the corresponding spatial features recovered by the algorithm (bottom 3 rows) under the various regularization conditions. The right panel of FIG. 3 displays a frame from the dataset taken at a time point when the corresponding region had a significant calcium signal, with the actual data shown in the top row and the corresponding reconstructed calcium signal for that time point under the various regularization conditions shown in the bottom 3 rows. It is noted that regions 1 and 2 correspond to the cell body and a dendritic branch of the same neuron. The manual labeling was purposefully split into two regions due to the fact that dendrites can have significantly different calcium dynamics from the cell body and thus it is often appropriate to treat calcium signals from dendrites as separate features from the cell body.

The data shown in FIG. 3 are particularly challenging to segment as the two large cell bodies (regions 1 and 3) are largely overlapping in space, necessitating a spatiotemporal segmentation. In addition to the overlapping cell bodies there are various small dendritic processes radiating perpendicular to (regions 4 and 5) and across (region 2) the focal plane that lie in close proximity to each other and have significant calcium transients. Additionally, at one point during the dataset the animal moves, generating a large artifact in the data. Nevertheless, optimizing (17) under the various regularization conditions, we observe that, as expected, the spatial features recovered by sparse regularization alone are highly noisy (FIG. 3, row 2). Adding low-rank regularization improves the recovered spatial features, but the features are still highly pixelated and contain numerous pixels outside of the desired regions (FIG. 3, row 3). Finally, by incorporating the total variation regularization the method produces coherent spatial features which are highly similar to the desired manual labelings (FIG. 3, rows 1 and 4), noting again that these features are found directly from the alternating minimization of (17) without the need to solve a secondary matrix factorization. For the two cases with low-rank regularization, A was initialized to be 100 uniformly sampled columns from an identity matrix (out of a possible 559), demonstrating the potential to reduce the problem size and achieve good results despite a very trivial initialization. For this application the first update of our alternating minimization was applied to Z, instead of A as shown in Algorithm 1 in FIG. 1.

While adding total variation regularization improves performance for a segmentation task, it also can cause a dilative effect when reconstructing the estimated calcium signal (for example, distorting the size of the thin dendritic processes in the left two columns of the example frames in FIG. 3). As a result, in a de-noising task it might instead be desirable to only impose sparse and low-rank regularization. The fact that the model is easily adaptable to account for many different features of the data depending on the desired task highlights the flexible nature and unifying framework of the proposed formulation (17).

In hyperspectral imaging (HSI), the data volume often displays a low-rank structure due to significant correlations in the spectra of neighboring pixels. This fact, combined with the large data sizes typically encountered in HSI applications, has led to a large interest indeveloping compressed sampling and recovery techniques to compactly collect and reconstruct HSI datasets. In addition, the spatial domain of an HSI dataset typically can be modeled under the assumption that it displays properties common to natural scenes, which led to a combined nuclear norm and total variation regularization (NucTV) of the form $$\min_X \|X\|_* + \lambda \sum_{i=1}^{t} \|(X^i)^T\|_{TV} \quad \text{s.t.} \|Y - \Phi(X)\|_F^2 \leq \epsilon. \quad (24)$$

Here $X \in \mathbb{R}^{t \times p}$ is the estimated HSI reconstruction with t spectral bands and p pixels, $X_i$ denotes the ith row of X (or the ith spectral band), $Y \in \mathbb{R}_{t \times m}$ contains the observed samples (compressed at a subsampling ratio of m=p), and $\Phi(\cdot)$ denotes the compressed sampling operator. To solve (24), a proximal gradient method is used, which requires solving a total variation proximal operator for every spectral slice of the data volume in addition to solving the proximal operator of the nuclear norm (singular value thresholding) at every iteration of the algorithm.

Figure 4:
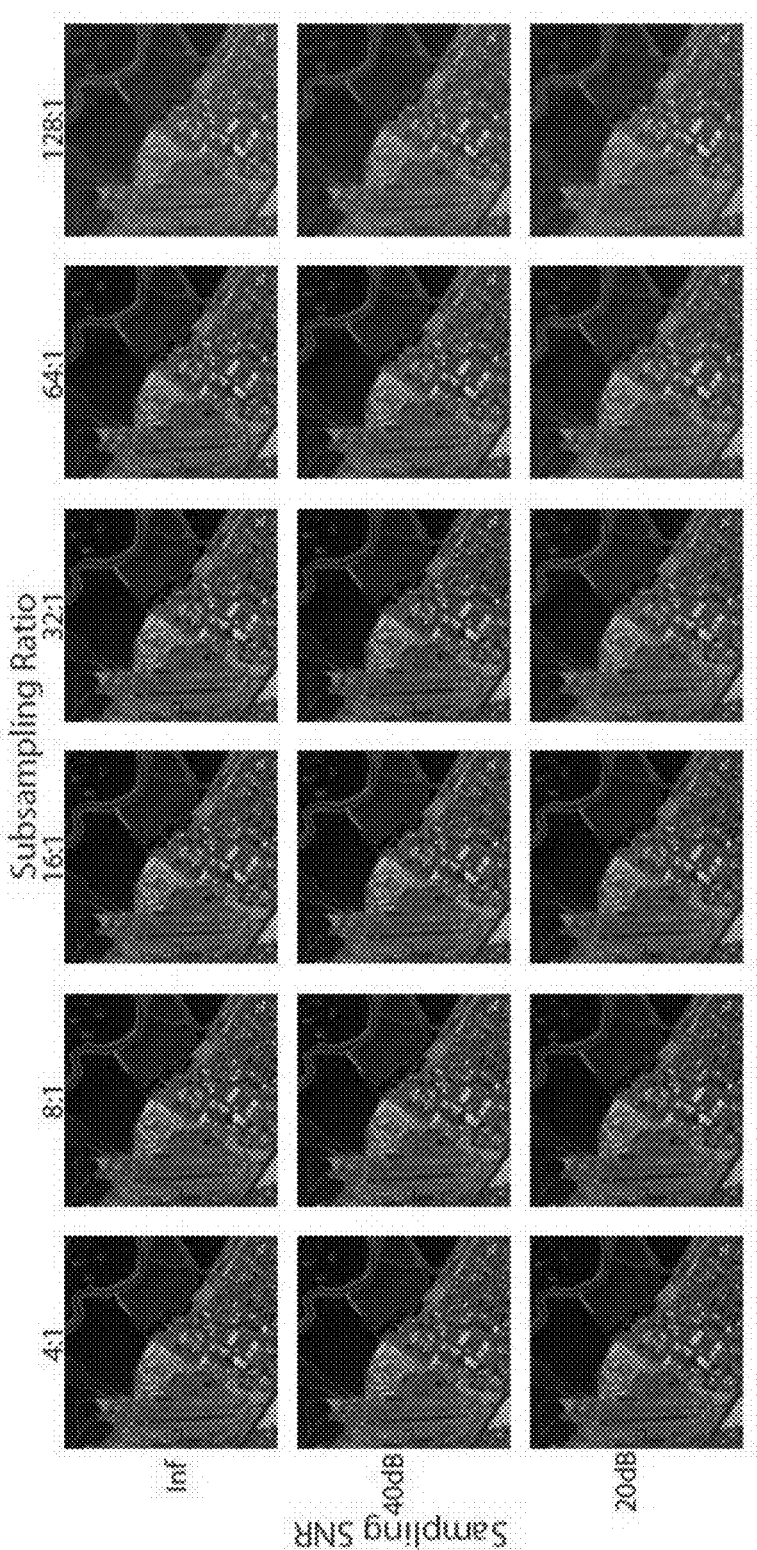
FIG. 4 illustrates images of hyperspectral compressed results.

For the large data volumes typically encountered in HSI, this can require significant computation per iteration. Here the matrix factorization method is used to perform hyperspectral compressed recovery by optimizing (17), where $\Phi(\cdot)$ is a compressive sampling function that applies a random-phase spatial convolution at each wavelength, A contains estimated spectral features, and Z contains estimated spatial abundance features. For HSI experiments, we set $v_a = v_{z1} = 0$ in (18) and (19). FIG. 4 illustrates images of hyperspectral compressed results. Example reconstructions from a single spectral band (i=50) under different subsampling ratios and sampling noise levels.

Compressed recovery experiments were performed on the dataset at various subsampling ratios and with different levels of sampling noise. The number of columns of A and Z was limited to 15 (the dataset is 256×256 pixels and 180 spectral bands), initialized one randomly selected pixel per column of Z to one and all others to zero, and initialized A as A=0. FIG. 3 shows examples of the recovered images at one wavelength (spectral band i=50) for various subsampling ratios and sampling noise levels and Table 1 shows the reconstruction recovery rates $\|X_{true} - AZ^T\|_F / \|X_{true}\|_F$. Even though optimized over a highly reduced set of variables ([256×256×15+180×15]=[256×256×180] 8:4%) with very trivial initializations, reconstruction error rates equivalent to or better than those in the prior art were achieved. Additionally, by solving the reconstruction in a factorized form, the method offers the potential to perform blind hyperspectral unmixing directly from the compressed samples without ever needing to reconstruct the full dataset. The data used are a subset of the publicly available AVARIS Moffet Field dataset.

TABLE 1

Hyperspectral imaging compressed recovery error rates.

| Sample Ratio | Our Method Sampling SNR (dB) | | | NucTV Sampling SNR (dB) | | |
|---|---|---|---|---|---|---|
| | ∞ | 40 | 20 | ∞ | 40 | 20 |
| 4:1 | 0.0209 | 0.0206 | 0.0565 | 0.01 | 0.02 | 0.06 |
| 8:1 | 0.0223 | 0.0226 | 0.0589 | 0.03 | 0.04 | 0.08 |
| 16:1 | 0.0268 | 0.0271 | 0.0663 | 0.09 | 0.09 | 0.13 |
| 32:1 | 0.0393 | 0.0453 | 0.0743 | 0.21 | 0.21 | 0.24 |
| 64:1 | 0.0657 | 0.0669 | 0.1010 | | | |
| 128:1 | 0.1140 | 0.1186 | 0.1400 | | | |

A highly flexible approach to projective tensor norm matrix factorization is proposed, which allows specific structure to be promoted directly on the factors. While the proposed formulation is not jointly convex in all of the variables, under certain criteria a local minimum of the factorization is sufficient to find a global minimum of the product, offering the potential to solve the factorization using a highly reduced set of variables.

The present invention can be implemented with any suitable computing device known to or conceivable by one of skill in the art. The computing device can be designed particularly to implement the complicated method of the present invention. Any such computer application will be fixed on a non-transitory computer-readable medium. It should be noted that the computer application is programmed onto a non-transitory computer-readable medium that can be read and executed by any of the computing devices mentioned in this application. The non-transitory computer-readable medium can take any suitable form known to one of skill in the art. The non-transitory computer-readable medium is understood to be any article of manufacture readable by a computer. Such non-transitory computer-readable media include, but are not limited to, magnetic media, such as a floppy disk, flexible disk, hard disk, reel-to-reel tape, cartridge tape, cassette tapes or cards, optical media such as CD-ROM, DVD, blu-ray, writable compact discs, magneto-optical media in disc, tape, or card form, and paper media such as punch cards or paper tape.

Alternatively, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application may be transmitted either wired or wirelessly over a network, via the internet, cellular telephone network, or any other suitable data transmission means known to or conceivable by one of skill in the art.

The many features and advantages of the invention are apparent from the detailed specification, and thus it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of data processing for a non-convex optimization problem comprising:
   receiving image or video data for processing of the non-convex optimization problem;
   applying low-rank and sparse matrix factorization techniques to the image or video data, wherein factors are regularized by a projective tensor norm, wherein the projective tensor norm is based on gauge functions;
   receiving prior information for incorporation into the low-rank and sparse matrix factorization techniques;
   recovering temporal and spatial features that are not visible in the received image or video data as a result of applying the specific matrix factorization technique to the image or video data;
   capturing additional structure in the factors using the projective tensor norm;
   solving an optimization problem to find a global minimum;
   generating the recovered temporal and spatial features based on the processed data; and,
   generating and displaying an image or video including the recovered temporal and spatial features.

2. The method of claim 1 further comprising applying the method to one selected from a group consisting of video segmentation and hyperspectral compressed recovery.

3. The method of claim 1 further comprising using a non-transitory computer readable medium programmed with the steps of the method for executing the method.

4. The method of claim 1 further comprising incorporating prior information into the matrix factorization technique.

5. The method of claim 1 further comprising using a rank-deficient local minimum to determine the global minimum.

6. The non-transitory computer readable medium of claim 1 further comprising using a rank-deficient local minimum to determine a global minimum.

7. A method of data processing for a non-convex optimization problem comprising:
   obtaining image or video data for processing of the non-convex optimization problem;
   applying low-rank and sparse matrix factorization to the image or video data;
   receiving prior information for incorporation into the low-rank and sparse matrix factorization techniques;
   applying a projective tensor norm, wherein the projective tensor norm is based on gauge functions, to regularize the low-rank and sparse matrix factorization of the image or video data, wherein a local minimum of the low-rank and sparse matrix factorization is used to find a global minimum for the image or video data;
   recovering temporal and spatial features as a result of applying the low-rank and sparse matrix factorization;
   capturing additional structure in the factors using the projective tensor norm;
   generating the recovered temporal and spatial features based on the processed data; and,
   generating and displaying an image or video including the recovered temporal and spatial features.

8. The method of claim 7 further comprising applying the method to one selected from a group consisting of video segmentation and hyperspectral compressed recovery.

9. The method of claim 7 further comprising using a non-transitory computer readable medium programmed with the steps of the method for executing the method.

10. A non-transitory computer readable medium programmed with steps comprising:
    receiving image or video data for processing of a non-convex optimization problem;
    applying low-rank and sparse matrix factorization techniques to the image or video data, wherein factors are regularized by a projective tensor norm;
    receiving prior information for incorporation into the low-rank and sparse matrix factorization techniques;
    recovering temporal and spatial features that are not visible in the received image or video data as a result of applying the specific matrix factorization technique to the image or video data;
    solving an optimization problem to find a global minimum;
    generating the recovered temporal and spatial features based on the processed data; and,
    generating and displaying a new image or video including the recovered temporal and spatial features.

11. The non-transitory computer readable medium of claim 10 further comprising applying the method to one selected from a group consisting of video segmentation and hyperspectral compressed recovery.

12. The non-transitory computer readable medium of claim 10 further comprising incorporating prior information into the matrix factorization technique.

13. The non-transitory computer readable medium of claim 10 further comprising the non-transitory computer readable medium residing on a computing device.

14. The non-transitory computer readable medium of claim 10 further comprising configuring the non-transitory computer readable medium for applications selected from a group consisting of biomedical video segmentation and hyperspectral compressed recovery.

* * * * *